(12) United States Patent
Chang et al.

(10) Patent No.: US 9,128,845 B2
(45) Date of Patent: Sep. 8, 2015

(54) DYNAMICALLY PARTITION A VOLATILE MEMORY FOR A CACHE AND A MEMORY PARTITION

(75) Inventors: Jichuan Chang, Sunnyvale, CA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 13/561,219

(22) Filed: Jul. 30, 2012

(65) Prior Publication Data

US 2014/0032818 A1 Jan. 30, 2014

(51) Int. Cl.
G06F 12/00 (2006.01)
G06F 12/08 (2006.01)
G06F 3/06 (2006.01)
G06F 12/06 (2006.01)

(52) U.S. Cl.
CPC ............ G06F 12/0802 (2013.01); G06F 3/068 (2013.01); G06F 3/0685 (2013.01); G06F 12/0646 (2013.01); G06F 2212/205 (2013.01); G06F 2212/2515 (2013.01); G06F 2212/601 (2013.01); G06F 2212/6012 (2013.01); Y02B 60/1225 (2013.01)

(58) Field of Classification Search
CPC ... G06F 3/068; G06F 3/0685; G06F 12/0646; G06F 2212/601; G06F 2212/205
USPC ....................... 711/129, 170, 173, 103, 105, 4
See application file for complete search history.

(56) References Cited

U.S. PATENT DOCUMENTS

| | | | |
|---|---|---|---|
| 5,875,451 A * | 2/1999 | Joseph .......................... | 711/105 |
| 6,449,699 B2 | 9/2002 | Franke | |
| 8,135,933 B2 | 3/2012 | Fisher | |
| 2010/0174847 A1* | 7/2010 | Paley et al. .................... | 711/103 |
| 2011/0082965 A1* | 4/2011 | Koka et al. .................... | 711/103 |
| 2011/0113215 A1* | 5/2011 | Thomas et al. ............... | 711/173 |
| 2011/0153916 A1* | 6/2011 | Chinnaswamy et al. ...... | 711/103 |
| 2012/0124318 A1* | 5/2012 | Bivens et al. ................. | 711/170 |
| 2012/0137055 A1* | 5/2012 | Lee et al. ...................... | 711/103 |
| 2012/0221785 A1* | 8/2012 | Chung et al. .................. | 711/105 |
| 2012/0311293 A1* | 12/2012 | Nemazie et al. .............. | 711/171 |

OTHER PUBLICATIONS

Hinkle, Jonathan, Viking Modular Solutions, Disruptive Hybrid Storage: Fusing DRAM and NAND, dated at least as early as Jul. 12, 2012 (16 pages).

Chiou et al., Computer Science and Artificial Intelligence Laboratory, Application-Specific Memory Management in Embedded Systems Using Software-Controlled Caches, Jun. 2000 (6 pages).

Jason D. Hiser, Effective Algorithms for Paritioned Memory Hierarchies in Embedded Systems, May 2005 (109 pages).

Jason D. Hiser et al., EMBARC: An Efficient Memory Bank Assignment Algorithm for Retargetable Compilers, Jun. 2004 (10 pages).

(Continued)

*Primary Examiner* — Hong Kim

(74) *Attorney, Agent, or Firm* — Trop, Prunner & Hu, P.C.

(57) ABSTRACT

A hybrid memory has a volatile memory and a non-volatile memory. The volatile memory is dynamically configurable to have a first portion that is part of a memory partition, and a second portion that provides a cache for the non-volatile memory.

15 Claims, 4 Drawing Sheets

(56) References Cited

OTHER PUBLICATIONS www.kaminario.com—Kaminario's Extreme Performance Speeds Applications, Kaminario K2 All Solid-state Flash and DRAM SAN Storage FAQs at least as early as Jul. 12, 2012 (5 pages).

Jeffrey C. Mogul et al., Operating System Support for NVM+DRAM Hybrid Main Memory, May 2009 (5 pages).

Moinuddin K. Qureshi et al., Morphable Memory System: A Robust Architecture for Exploiting Multi-Level Phase Change Memories, Jun. 2010 (10 pages).

\* cited by examiner

DYNAMICALLY PARTITION A VOLATILE MEMORY FOR A CACHE AND A MEMORY PARTITION

BACKGROUND

Various types of storage devices are available for storing data. Storage devices can include volatile memory devices or non-volatile memory devices. Examples of volatile memory devices include dynamic random access memory (DRAM) devices or static random access memory (SRAM) devices. Examples of non-volatile memory devices include flash memory devices and phase change memory (PCM) devices.

BRIEF DESCRIPTION OF THE DRAWINGS

Some embodiments are described with respect to the following figures.

DETAILED DESCRIPTION

Figure 1:
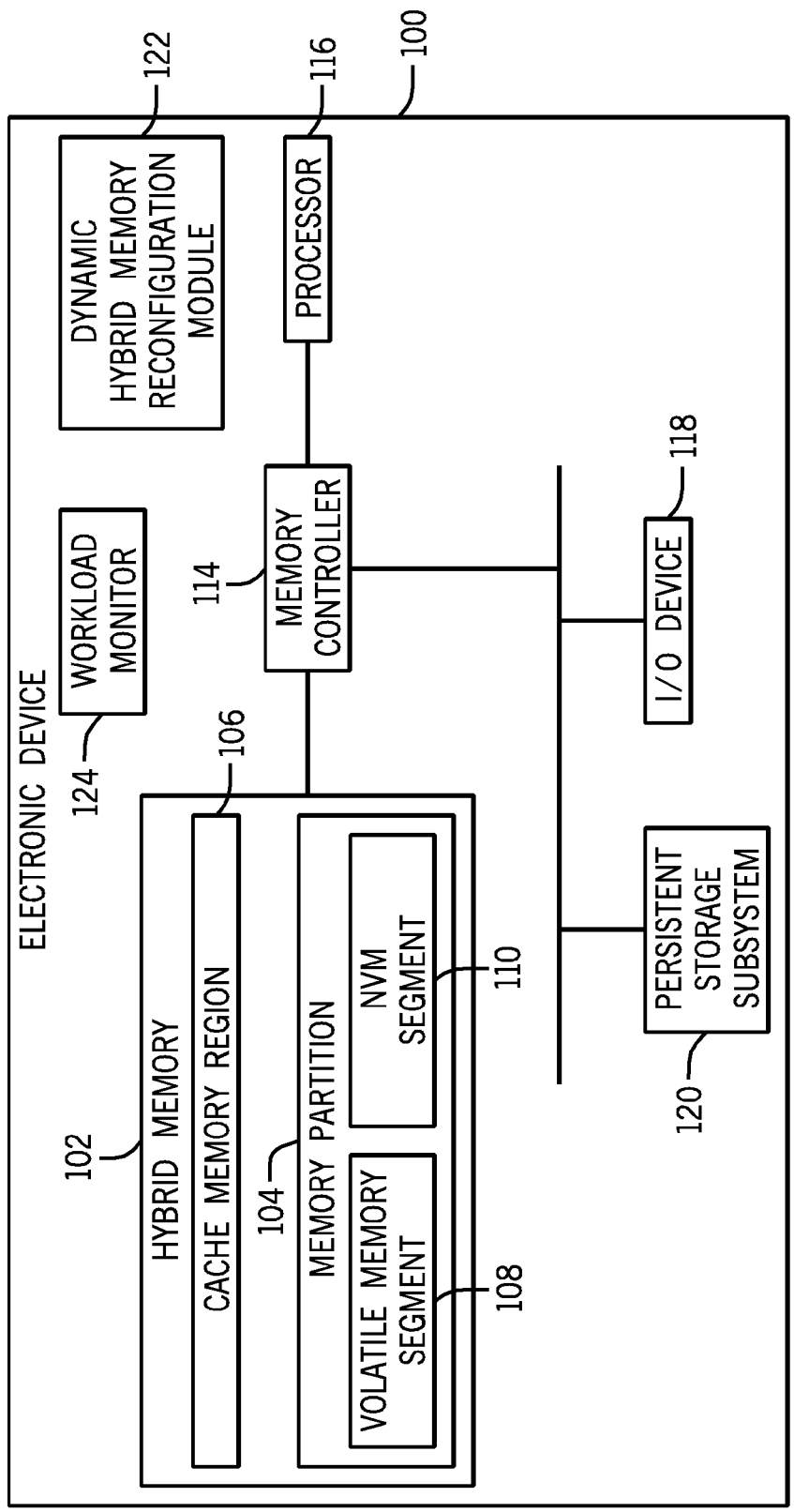
FIG. 1 is a block diagram of an example electronic device according to some implementations.

Different types of memory devices are associated with different characteristics. A volatile memory device such as a dynamic random access memory (DRAM) device has relatively fast access speeds (for both reads and writes). However, DRAM devices generally are relatively expensive in terms of power and cost. A DRAM device is considered to be a volatile memory device since any data stored in the DRAM device would be lost if power were removed from the DRAM device.

Another type of volatile memory device is a static random access memory (SRAM) device, which is associated with even higher access speeds, but also is associated with higher power and cost. Although reference is made to DRAM and SRAM devices, it is noted that there can also be other types of volatile memory devices.

Examples of non-volatile memory devices include flash memory devices, which are based on an electrically erasable programmable read-only memory (EEPROM) technology. NAND-type flash memory devices generally have higher density than DRAM devices, and do not use refresh power that is used by DRAM devices. However, a NAND-type flash memory device can be associated with relatively slow read speeds and especially slow write speeds, since the NAND-type flash memory device is written by first erasing a relatively large block of data before the large block can be rewritten with new data. Non-volatile memory devices also have much lower endurance than DRAM devices; for example, memory cells in a NAND-type flash memory can only sustain less than 100,000 writes. Another type of flash memory device is a NOR-type flash memory device that allows for random access reads similar to DRAM devices, but at higher cost and even slower write speeds.

Non-volatile memory devices can also be implemented with a phase change memory technology. The phase change material in a phase change memory can be switched between different states (e.g. amorphous state and crystalline state), in response to application of heat using electrical pulses. Data in a phase change memory is stored in the form of a resistance (an amorphous state has a higher resistance than a crystalline state). A phase change memory is also slower than a DRAM, although the read speed is comparable to a DRAM. Writes to a phase change memory are much slower than reads, and can result in greater energy consumption. In addition, a phase change memory may also be associated with endurance issues resulting from multiple writes.

Although various types of non-volatile memory devices are discussed above, it is noted that in other implementations, other types of non-volatile memory devices can be used. A non-volatile memory device is built using solid state or integrated circuit technology, with the cells of the non-volatile memory formed on a semiconductor substrate. A non-volatile memory device is different from a disk-based persistent storage device, which stores data on magnetic-based or optical-based rotating media.

In accordance with some implementations, a hybrid memory can be provided in an electronic device (e.g. computer, personal digital assistant, smartphone, game appliance, server, switch, router, etc.) to provide benefits associated with different types of memory devices, including volatile memory devices and non-volatile memory devices. Volatile random access memory (e.g. a DRAM device, an SRAM device, etc.) in the hybrid memory can provide relatively fast access speeds and can mitigate performance, energy consumption, and endurance issues resulting from multiple writes. Non-volatile memory (e.g. a flash memory device, a phase change memory, etc.) can provide benefits of relatively dense and less expensive memory.

In some scenarios, the arrangement of volatile memory and non-volatile memory in a hybrid memory can be statically defined. For example, one static configuration of a hybrid memory can be one where the volatile memory is used exclusively as a cache to temporarily store and service data on behalf of non-volatile memory in the hybrid memory. As another example, another static configuration of a hybrid memory can be one where the volatile memory and non-volatile memory form different segments of a memory partition, and the volatile memory is not used as a cache for the non-volatile memory. With a hybrid memory that is statically configured, flexibility is reduced. Also, if a particular static configuration of the hybrid memory is not optimal for a given workload of an electronic device, then performance of the electronic device can suffer.

For example, using the volatile memory exclusively as a cache can mean that the volatile memory is not available for use by applications (or other software or machine-readable instructions) in an electronic device, and thus the overall size of the memory partition is smaller. Also, if there is a mismatch between data access patterns and a specific cache policy, then the cache may experience low cache utilization.

On the other hand, using the volatile memory as part of the memory partition can increase the overall size of the memory partition that is accessible by applications (or other software or machine-readable instructions). However, this may lead to data swapping between the volatile memory and the non-volatile memory, which can incur performance, energy, and endurance issues (note that repeated writes to a non-volatile memory can reduce the lifetime of the non-volatile memory). Additionally, managing placement of data between the volatile memory and non-volatile memory segments of the memory partition can lead to increased system overhead.

In accordance with some implementations, dynamic configuration of a hybrid memory can be performed at run-time of an electronic device. Performing dynamic configuration at run-time of the electronic device refers to changing a characteristic of the hybrid memory during or in response to operation of the electronic device.

In some examples, the dynamic configuration of a hybrid memory can be in response to a trigger that is based on workload (including reads, writes, etc.) associated with operation of the hybrid memory. Dynamic configuration of the hybrid memory can include dynamically partitioning the volatile memory in the hybrid memory into multiple portions for inclusion in a cache memory region, a memory partition, or both the cache memory region and memory partition. For example, the volatile memory can be dynamically partitioned to have a first portion that is part of the memory partition, and a second portion that is part of the cache memory region.

FIG. 1 is a block diagram of an example electronic device 100 that includes a hybrid memory 102. The hybrid memory 102 can be implemented with different types of memory devices, including volatile memory and non-volatile memory. Generally, "volatile memory" can be implemented with one or multiple volatile memory devices (or any portion thereof), such as DRAM devices, SRAM devices, and so forth. Similarly, "non-volatile memory" can be implemented with one or multiple non-volatile memory devices (or any portion thereof), such as flash memory devices, phase change memory devices, and so forth.

The hybrid memory 102 can have a memory partition 104 and a cache memory region 106. The memory partition 104 of the electronic device 100 includes an overall memory space available to store data in the electronic device 100. Note that the memory partition 104 is distinct from a persistent storage subsystem 120 in the electronic device 100. The persistent storage subsystem 120 can be implemented with persistent storage devices such as disk-based storage devices or other slower storage devices.

The memory partition 104 has a volatile memory segment 108 and a non-volatile memory (NVM) segment 110. The volatile memory segment 108 is implemented with at least one type of volatile memory, while the NVM segment 110 is implemented with at least one type of non-volatile memory. The volatile memory segment 108 and NVM segment 110 are considered to be parallel, exclusive memory partition segments that form different parts of the overall memory space. The memory address space of the volatile memory segment 108 is distinct from (exclusive of) the memory address space of the NVM segment 110. Applications (or other software or other machine-readable instructions) are able to manage placement of data in a selected one of the volatile memory segment 108 and NVM segment 110, since both segments are visible to the applications (or other software or other machine-readable instructions).

The cache memory region 106 can be used to cache data (temporarily buffer data) for the memory partition 104, and more particularly, for the NVM segment 110 of the non-volatile memory. In such an example, the cache memory region 106 is considered to be part of the same memory address space as the NVM segment 110, since the cache memory region 106 stores copies of data that are also stored in the NVM segment 110.

Access of the hybrid memory 102 is managed by a memory controller 114, which is able to submit commands to the hybrid memory 102 in response to memory requests from requesters, including a processor 116. Note that memory requests can also be received from other requesters in the electronic device 100, such as an input/output (I/O) device 118.

In accordance with some implementations, the electronic device 100 also includes a dynamic hybrid memory reconfiguration module 122. In some examples, the dynamic hybrid memory reconfiguration module 122 can be implemented with machine-readable instructions, which can be part of an operating system (OS), a hypervisor (also referred to as a virtual machine monitor), or any other software or firmware module of the electronic device 100. A hypervisor is used to virtualize physical resources of a physical machine (such as the electronic device 100) to allow such physical resources to be shared by virtual machines in the system.

The dynamic hybrid memory reconfiguration module 122 can dynamically reconfigure the hybrid memory 102, such that the size of the volatile memory segment 108 of the memory partition segment 108 and the size of the cache memory region 106 can be varied in response to a predefined trigger, such as a trigger produced based on the workload of the electronic device 100. The workload of the electronic device 100 can be monitored by a workload monitor 124, which can be implemented as machine-readable instructions. In other examples, the workload monitor 124 can be part of the dynamic hybrid memory configuration module 122.

In some examples, depending upon the workload (as monitored by the workload monitor 124), the size of the volatile memory segment 108 of the memory partition 104 can be increased or decreased, and the corresponding size of the cache memory region 106 can be decreased or increased.

Figure 2:
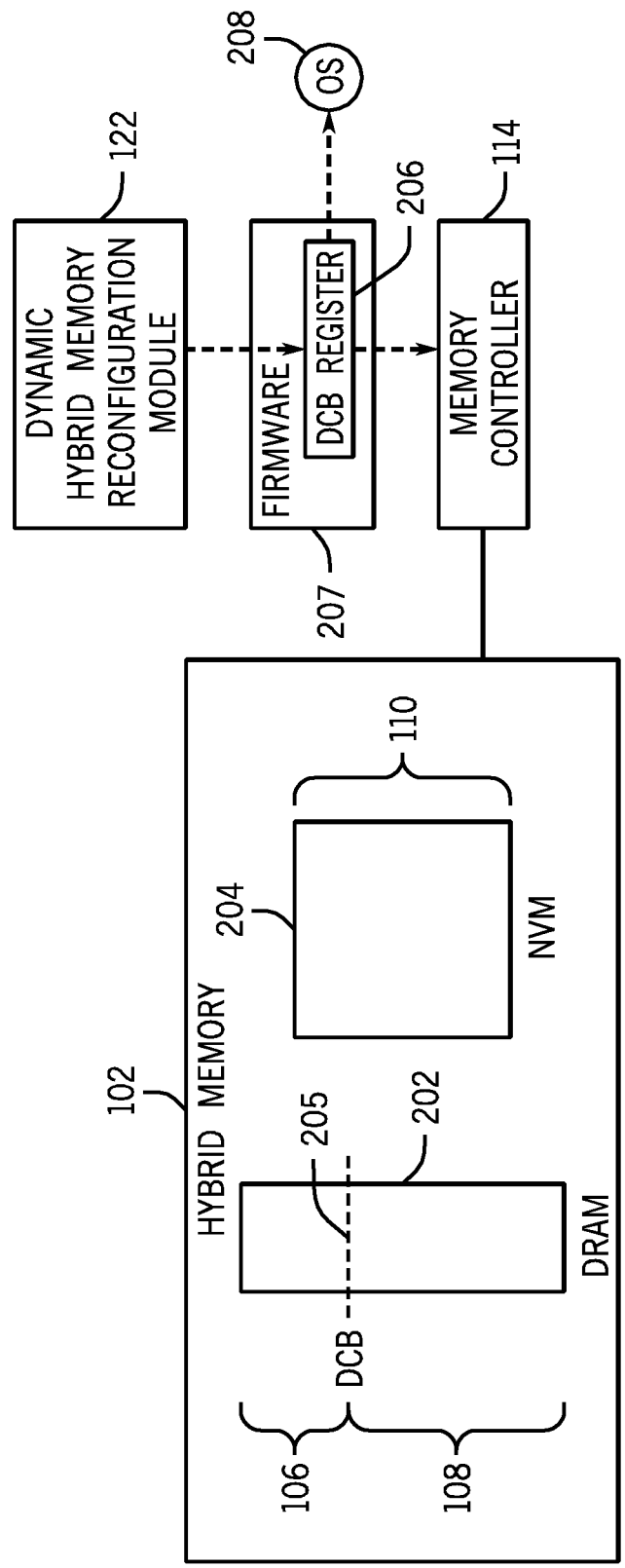
FIG. 2 is a block diagram of a portion of an electronic device according to further implementations.

FIG. 2 is a block diagram of a portion of the electronic device 100, in accordance with further implementations. The hybrid memory 102 of FIG. 2 includes a DRAM 202 and a non-volatile memory 204. Although reference is made to the DRAM 202 in FIG. 2, it is noted that other types of volatile memory devices can be used in other examples.

The DRAM 202 can be divided into a first portion (above dashed line 205) that forms part of the cache memory region 106, and a second portion (below the dashed line 205) that forms part of the volatile memory segment 108 of the memory partition 104.

The non-volatile memory 204 forms the NVM segment 110 of the memory partition 104. As noted above, the non-volatile memory 204 can be implemented with one or multiple flash memory devices, and/or one or multiple phase change memory devices.

A phase change memory can be configured as a single-level cell (SLC) memory, in which each of the memory cells of the SLC memory represents one bit. Alternatively, phase change memory can be configured as a multi-level cell (MLC) memory, in which each of the memory cells of the MLC memory represents multiple (two or more) bits. An MLC memory can achieve a higher density than an SLC memory.

In some examples, portions of the phase change memory can be morphed (changed) to cause a memory cell to represent a different number of bits. For example, a given portion of the phase change memory can initially have memory cells each configured to represent 4 data bits. At a later time, the given portion of the phase change memory can be morphed such that each memory cell is configured to represent 2 data bits, or just 1 data bit. The morphing of the portions of the phase change memory between a higher density configuration (each memory cell represents a larger number of data bits) and a lower density configuration (each memory cell represents a smaller number of data bits) can lead to a modification of the size of the cache memory region 106. For example, if the phase change memory is changed to have a larger number of portions with the higher density configuration, then it may be desirable to increase the size of the cache memory region 106 to cache data for the phase change memory, since a phase change memory portion having a higher density configuration is associated with an increased access latency (reduced access speed) and lower endurance.

In some examples, the dashed line 205 depicted in FIG. 2 represents a DRAM Cache Begin (DCB) value, which specifies the starting address (in the DRAM 202) for the cache memory region 106. In such examples, the portion of the DRAM 202 that forms the volatile memory segment 108 of the memory partition 104 starts at address 0 (or other predefined address) and proceeds to an address right below DCB. The cache memory region 106 starts at address DCB and proceeds to the ending address (or other predefined address) of the DRAM 202.

In other examples, instead of using a single DCB value to define the cache memory region portion and memory partition portion of the DRAM 202, multiple values can be used to specify the respective address ranges corresponding to the cache memory region 106 and the volatile memory segment 108 of the memory partition 104.

The DCB value can be dynamically configured by the dynamic hybrid memory configuration module 122. In some examples, the DCB value can be stored in a DCB register 206, which can be part of firmware 207 (e.g. basic input/output system or BIOS code), an operating system 208, or any other entity of the electronic device 100. The dynamic hybrid memory configuration module 122 can dynamically update the DCB value in the DCB register 206 at run-time to repartition the cache memory region 106 and the volatile memory segment 108 of the memory partition 104.

Note that in some implementations, the memory controller 114 can maintain metadata regarding the partitioning of the hybrid memory 102 (e.g. the memory controller 114 can store the DCB value along with other information regarding how the hybrid memory 102 is partitioned). In such implementations, whenever the DCB register 206 is updated, the corresponding metadata in the memory controller 114 can be updated.

In other implementations where a software memory manager is provided, any metadata stored in the software memory manager relating to the partitioning of the hybrid memory 102 can also be updated in response to update of the DCB register 206.

Figure 3:
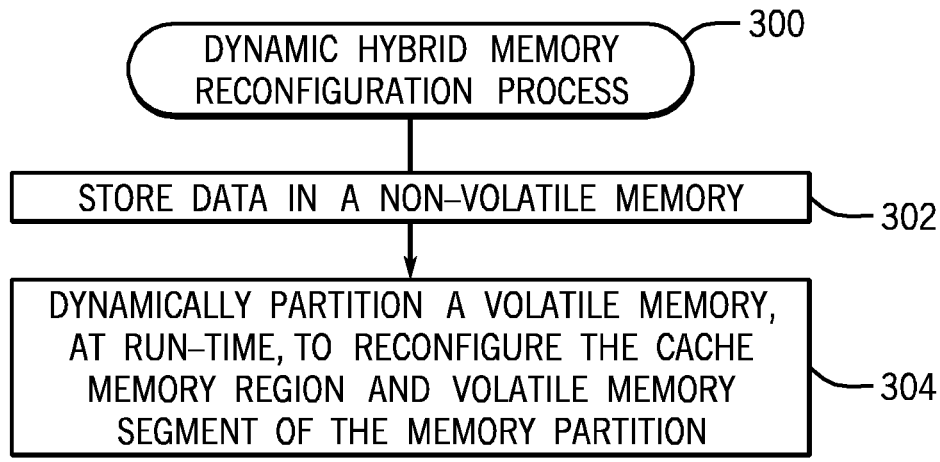
FIGS. 3 and 4 are flow diagrams of dynamic hybrid memory reconfiguration processes according to various implementations.

FIG. 3 is a flow diagram of a dynamic hybrid memory reconfiguration process 300 according to some implementations. The process 300 can be performed by the dynamic hybrid memory configuration module 122 of FIG. 1 or 2, for example. The process 300 stores (at 302) data in the non-volatile memory 204 that provides the NVM segment 110 of the memory partition 104.

The process 300 further dynamically partitions (at 304) the volatile memory 202, at run-time, to reconfigure the sizes of the cache memory region 106 and the volatile memory segment 108 of the memory partition 104.

Figure 4:
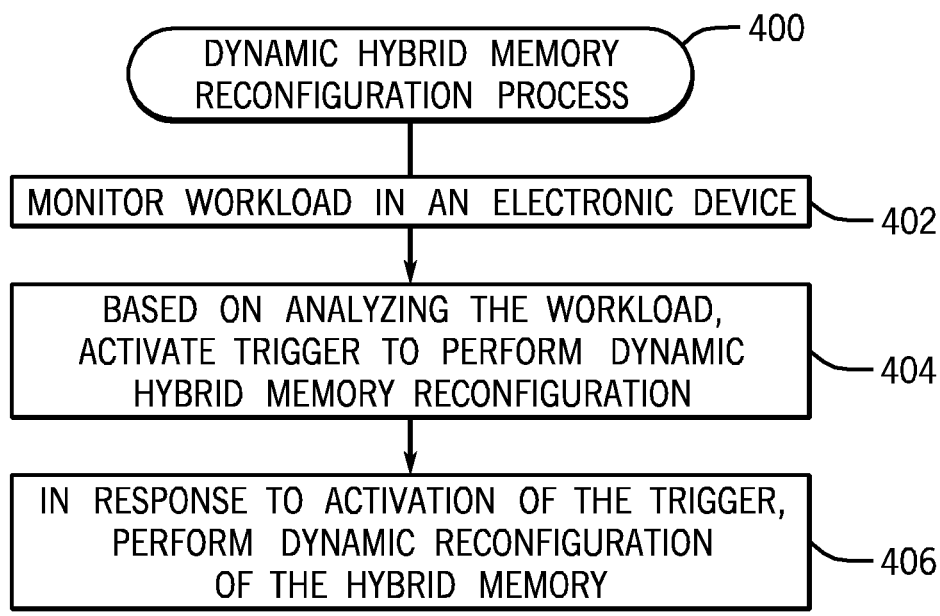

FIG. 4 is a dynamic hybrid memory reconfiguration process 400 according to further implementations. The process 400 can be performed by the dynamic hybrid memory configuration module 122 and the workload monitor 124 discussed above, for example.

The workload monitor 124 monitors (at 402) workload in the electronic device 100. Based on analyzing the monitored workload, the dynamic hybrid memory configuration module 122 can activate (at 404) a trigger to perform dynamic hybrid memory reconfiguration. In some cases, the trigger is activated in response to observed characteristics of workload over some predefined time interval. In other examples, the trigger can be performed in response to a predicted workload (for a future time interval), where the prediction can be based on an observed workload.

The trigger can also be based on a determination of the working set size and access locality of the workload. A working set size refers to the size of a set of data on which a particular entity (or group of entities) in the electronic device 100 are processing. For enhanced efficiency, the working set is stored in the memory partition 104 for access by the entity or entities. Also, providing a significant portion of the working set in the cache memory region 106 can improve performance. Access locality refers to whether data items (e.g. data pages, data blocks, etc.) that are accessed are located in consecutive or predictable storage locations, or whether the data items are spread apart or at locations that are hard to predict.

In response to activation of the trigger, the dynamic hybrid memory configuration module 122 performs (at 406) dynamic reconfiguration of the hybrid memory 102, based on one or multiple reconfiguration policies. A reconfiguration policy can specify how the hybrid memory configuration is to be performed based on the observed or predicted workload.

For example, if the accessed data pattern has a relatively small footprint (the size of data items accessed is relatively small), where the footprint of the accessed data pattern is smaller than the entire volatile memory capacity but larger than the cache memory region size, then the hybrid memory configuration can increase the portion of the DRAM 202 that provides the volatile memory segment 108 of the memory partition 104 to store the footprint in the volatile memory segment 108.

As another example, if a working set size of an accessed data pattern is relatively large (larger than the size of the DRAM 202 in FIG. 2, for example), and accesses are mostly read-only, this can lead to page swapping between the DRAM 202 and the NVM segment 110 of the memory partition 104. Page swapping can artificially increase the number of high-overhead page writes to the non-volatile memory 204. In such scenario, the hybrid memory configuration can increase the portion of the DRAM 202 that is part of the cache memory region 106.

As yet another example, if the accessed data pattern has a relatively large footprint (the size of a data item accessed is relatively large), then that may indicate a preference for a higher-density configuration of the non-volatile memory 204 that is implemented with a phase change memory. In this case, it may be desirable to increase the portion of the DRAM 202 that provides the cache memory region 106; increasing the cache memory region 106 size can reduce the number of writes to the phase change memory.

As yet a further example, if the accessed data pattern has a relatively small working set size that is relatively stable over time, then a larger portion of the DRAM 202 can be exposed in the memory partition 104. On the other hand, if the working set size changes and is unstable and changes over time, therefore making it harder for the application to explicitly manage the data placement between volatile versus non-volatile memory segments of the memory partition 104, then it may be desired to use more of the DRAM 202 in the cache memory region 106.

Although various example reconfiguration policies are listed above, it is noted that other or alternative reconfiguration policies can be specified for dynamic reconfiguration of the hybrid memory 102.

The following describes various system-related tasks that are performed in connection with reconfiguration of the hybrid memory 102. Reference is made to the example of FIG. 2 in the following discussion.

Figure 5:
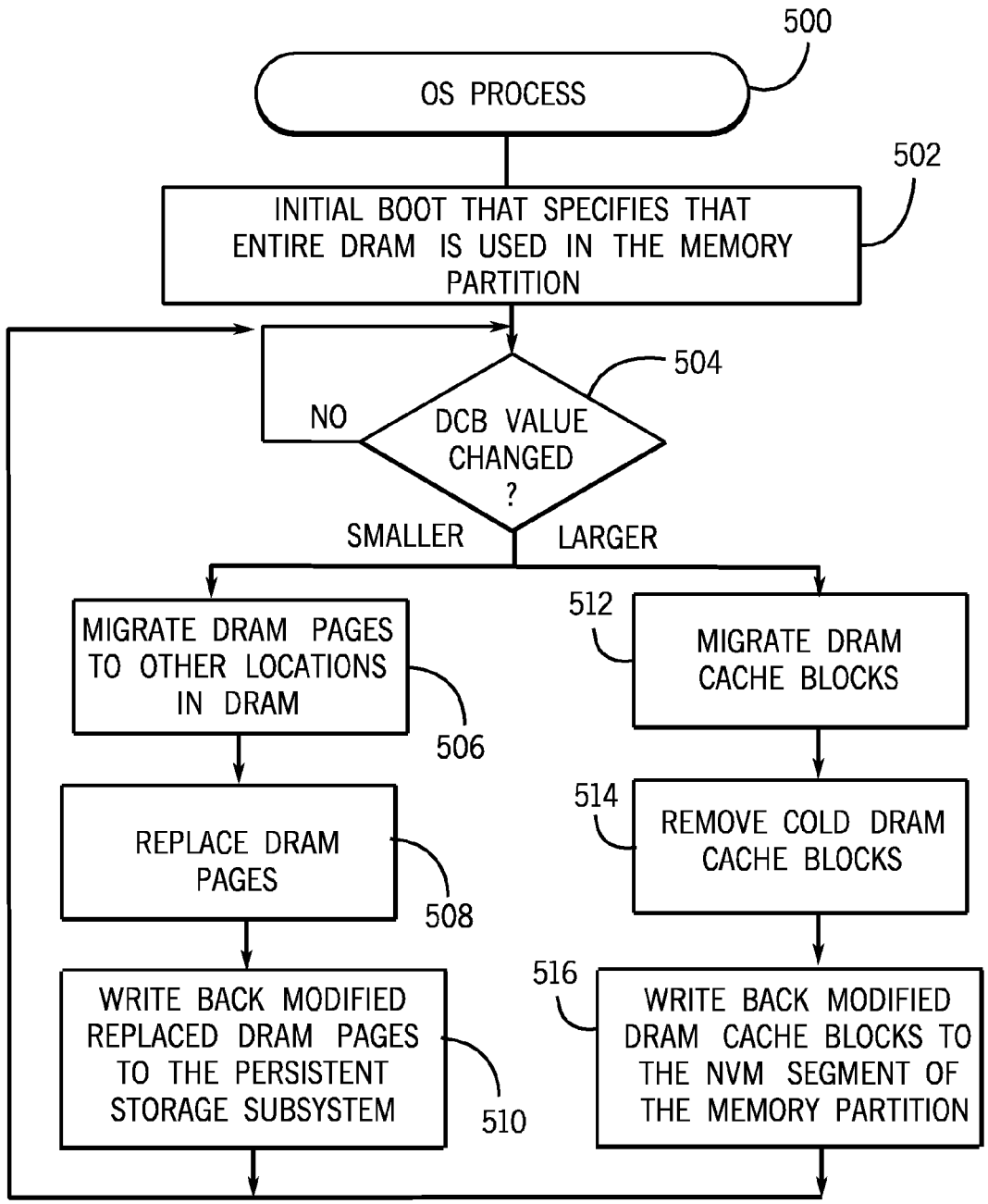
FIG. 5 is a flow diagram of an operating system process according to some implementations that is performed as part of a hybrid memory configuration process.

In some implementations, system software (e.g. the OS 208 or a hypervisor) adjusts a pool of available DRAM pages based on the current DCB value of FIG. 2. FIG. 5 depicts an example process 500 performed by the OS 208 as part of a hybrid memory reconfiguration process (e.g. 300 or 400 of FIG. 3 or 4). In other examples, the process 500 can be performed by another entity, such as the hypervisor or another entity. The OS 208 can initially boot up (at 502) assuming that the entire DRAM 202 is used in the memory partition 104 (and none of the volatile memory is used as a cache). In such an example, the DCB value can be specified to be at the end of the DRAM 202.

When the OS 208 detects (at 504) a subsequent change of the DCB value that causes the DCB value to be smaller than the end of the DRAM 202, that means that a portion of the DRAM 202 will be provided for the cache memory region 106. In this case, the OS 208 can migrate (at 506) pages of the DRAM 202 that will become part of the cache memory region 106 to different locations in the DRAM 202 for compaction. The OS 208 can replace (at 508) pages (e.g. cold pages that have not been accessed in a while) to make space for the migrated pages and, if the replaced pages are modified or dirty, the replaced pages are written back (at 510) to the persistent storage subsystem 120 (FIG. 1). The migrated pages can eventually be removed from the OS's pool of available DRAM pages, since these migrated pages are no longer part of the memory partition 104. The process 500 of FIG. 5 can then return to task 504 where the OS 208 can check for a further change of the DCB value.

When the OS later detects (at 504) that the DCB value is changed to a larger value (which reduces the size of the cache memory region 106 and increases the size of the volatile memory segment 108 of the memory partition 104), the OS 208 or the memory controller 114 can migrate (at 512) DRAM cache blocks that are to be removed to make space for increased volatile memory segment 108. Cold DRAM cache blocks can be removed (at 514) directly, and dirty DRAM cache blocks can be written back (at 516) to the NVM segment 110 of the memory partition 104. Eventually, the OS 208 can add newly reclaimed DRAM pages to the pool of available DRAM pages.

Various modules discussed above, such as the dynamic hybrid memory reconfiguration module 122 and the workload monitor 124, can be implemented in the electronic device or as machine-readable instructions that can be loaded for execution on a processor or processors. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of providing a hybrid memory, comprising:
storing data in a non-volatile memory that is part of a memory partition for an electronic device; and
during run-time of the electronic device, dynamically partitioning a volatile memory in the electronic device into a first portion that is part of the memory partition, and a second portion that provides a cache for the non-volatile memory, wherein the non-volatile memory and the volatile memory are part of the hybrid memory, wherein the non-volatile memory comprises a phase change memory having a portion morphable between a first configuration in which each memory cell of the portion represents a first number of data bits, and a second configuration in which each memory cell of the portion represents a second, different number of data bits, and wherein the dynamic partitioning of the volatile memory is in response to whether the portion has the first configuration or the second configuration.

2. The method of claim 1, wherein the dynamically partitioning comprises:
modifying a size of the first portion relative to a size of the second portion.

3. The method of claim 2, further comprising triggering the modifying in response to a workload of the electronic device.

4. The method of claim 3, wherein the workload is at least one selected from among an observed workload or a predicted workload.

5. The method of claim 1, wherein the volatile memory includes a dynamic random access memory.

6. The method of claim 1, wherein dynamically partitioning the volatile memory comprises dynamically modifying at least one value, stored in a register that is part of basic input/output system (BIOS) code or an operating system, to change the first portion and the second portion of the volatile memory.

7. The method of claim 1, wherein dynamically partitioning the volatile memory is based on at least one predefined reconfiguration policy that specifies different configurations of the hybrid memory for different workload characteristics.

8. An electronic device comprising:
a hybrid memory having a volatile memory and a non-volatile memory, wherein the volatile memory is dynamically configurable to vary relative sizes of plural portions of the volatile memory, where a first of the plural portions is used in a memory partition that also includes the non-volatile memory, and where a second of the plural portions is used as a cache for the non-volatile memory, and wherein the non-volatile memory comprises a phase change memory, wherein a portion of the phase change memory is morphable between a first configuration in which each memory cell of the portion represents a first number of data bits, and a second configuration in which each memory cell of the portion represents a second, different number of data bits; and a dynamic hybrid memory configuration module to dynamically reconfigure the first and second portions of the volatile memory in response to a workload of the electronic device and in response to whether the portion of the phase change memory has the first configuration or the second configuration.

9. The electronic device of claim 8, wherein the memory partition has a first segment that includes the first portion of the volatile memory, and a second segment that includes the non-volatile memory, wherein the first segment and second segment are exclusive of one another.

10. The electronic device of claim 9, further comprising machine-readable instructions executable to select one of the first segment and second segment for placement of data.

11. The electronic device of claim 8, wherein the volatile memory is selected from among a dynamic random access memory or a static random access memory.

12. The electronic device of claim 8, further comprising:
a register to store a value that is modifiable to dynamically reconfigure the volatile memory, wherein the value defines the first and second portions of the volatile memory.

13. The electronic device of claim 8, further comprising a workload monitor to monitor the workload.

14. An article comprising at least one non-transitory machine-readable storage medium storing instructions that upon execution cause an electronic device to:
store data in a non-volatile memory that is part of a memory partition for the electronic device; and
during run-time of the electronic device, dynamically partition a volatile memory in the electronic device into a first portion that is part of the memory partition, and a second portion that provides a cache for the non-volatile memory, wherein the non-volatile memory and the volatile memory are part of a hybrid memory, wherein the non-volatile memory comprises a phase change memory having a portion morphable between a first configuration in which each memory cell of the portion represents a first number of data bits, and a second configuration in which each memory cell of the portion represents a second, different number of data bits, and wherein the dynamic partitioning of the volatile memory is in response to whether the portion has the first configuration or the second configuration.

15. The article of claim 14, wherein the dynamically partitioning comprises:
modifying a size of the first portion relative to a size of the second portion.

* * * * *